(12) United States Patent
Cao

(10) Patent No.: US 12,729,789 B2
(45) Date of Patent: Sep. 8, 2026

(54) FEMALE CONNECTOR AND CONNECTOR ASSEMBLY

(71) Applicant: Illinois Tool Works Inc., Glenview, IL (US)

(72) Inventor: Cong Cao, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 19/214,763

(22) Filed: May 21, 2025

(65) Prior Publication Data

US 2025/0361959 A1 Nov. 27, 2025

(30) Foreign Application Priority Data

May 23, 2024 (CN) ........................ 202410649550.X
May 16, 2025 (CN) ........................ 202510642147.9

(51) Int. Cl.
*F16L 37/12* (2006.01)
*F16L 37/098* (2006.01)

(52) U.S. Cl.
CPC ....... *F16L 37/0982* (2013.01); *F16L 2201/10* (2013.01)

(58) Field of Classification Search
CPC ... F16L 37/0841; F16L 37/12; F16L 37/1205; F16L 37/1235; F16L 37/086; F16L 37/0885; F16L 37/088; F16L 2201/10
See application file for complete search history.

(56) References Cited

U.S. PATENT DOCUMENTS

| | | | |
|---|---|---|---|
| 7,695,024 | B2 | 4/2010 | Ostergren |
| 11,326,728 | B2 | 5/2022 | Ma |
| 11,480,277 | B2 | 10/2022 | Trotter |
| 11,644,139 | B2 | 5/2023 | Han |
| 12,123,529 | B2 | 10/2024 | Güttinger |
| 12,241,576 | B2 | 3/2025 | Cao |

(Continued)

FOREIGN PATENT DOCUMENTS

| | | | |
|---|---|---|---|
| CN | 118110856 | A | 5/2024 |
| DE | 102023108109 | A1 | 10/2024 |
| WO | 2016003686 | A1 | 1/2016 |

*Primary Examiner* — Aaron M Dunwoody
(74) *Attorney, Agent, or Firm* — McAndrews, Held & Malloy, Ltd.

(57) ABSTRACT

The present disclosure provides a female connector and a connector assembly. The female connector includes a female connector shell and a snap-fit fastener. The retaining portion is elastically deformable and the retaining portion and the locking portion are configured to enter the receiving channel through the retaining channel and the locking channel, respectively, wherein the snap-fit fastener has a first position and a second position, and is movable between the first position and the second position in a radial direction of the female connector shell. The retaining portion is configured to elastically deform under the action of the male connector to provide a force that drives the snap-fit fastener to move from the first position to the second position. The snap-fit fastener in the first position can move to the second position only after the male connector and the female connector are fixed, so that it is possible to visually determine whether the male connector and the female connector are fixed.

19 Claims, 11 Drawing Sheets

(56) References Cited

U.S. PATENT DOCUMENTS

| | | | | |
|---|---|---|---|---|
| 2014/0062080 | A1* | 3/2014 | Battisti ................. | F16L 37/086 285/86 |
| 2017/0356581 | A1 | 12/2017 | Trotter | |
| 2024/0019060 | A1 | 1/2024 | Cao | |
| 2024/0019063 | A1 | 1/2024 | Cao | |
| 2024/0084897 | A1 | 3/2024 | Cao | |
| 2024/0353040 | A1 | 10/2024 | Cao | |
| 2025/0060060 | A1 | 2/2025 | Cao | |

* cited by examiner 235
231
230
336
344
343
346
345
337
342

A-A 212
240
755
751
111
757
750

B-B

FEMALE CONNECTOR AND CONNECTOR ASSEMBLY

RELATED APPLICATIONS

The present application claims the benefit of Chinese Patent Application Nos. 202410649550.X, filed May 23, 2024, and 202510642147.9, filed May 16, 2025, each titled "Female Connector and Connector Assembly," the contents of which are hereby incorporated by reference.

BACKGROUND

A quick-connector type connector assembly is a connector that can achieve connection or disconnection of a pipeline without tools. The quick-connector type connector assembly generally includes a male connector and a female connector which are respectively connected to two pipes to be connected. A user can directly insert the male connector into the female connector without the need for external tools to achieve fitting connection between the male connector and the female connector to allow fluid to flow through a pipeline of the connector assembly, so that the two pipes to be connected are in communication with each other by the connector assembly.

Since the male connector is inserted into the female connector, it is difficult to directly determine from the appearance whether the male connector is inserted in place. Therefore, the connector assembly generally further includes an indicating component, such as a clip or a snap-fit fastener, for indicating whether the male connector is inserted in place.

SUMMARY

The present disclosure relates generally connector assemblies, and in particular to a quick-connector type female connector and a connector assembly, substantially as illustrated by and described in connection with at least one of the figures, as set forth more completely in the claims.

BRIEF DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION

Figure 1A:
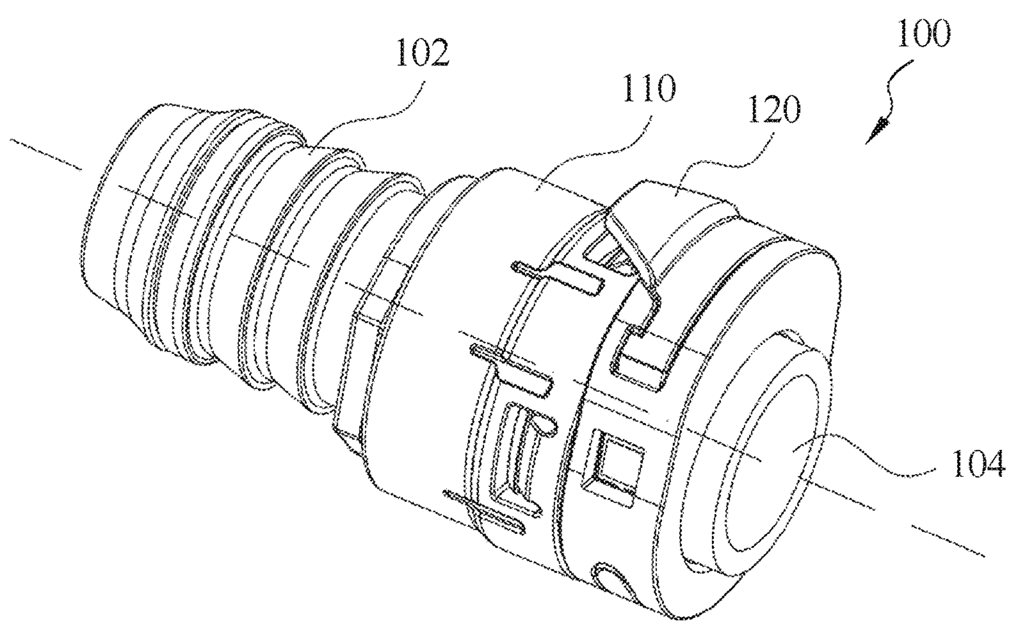
FIG. 1A is a structural perspective view of a connector assembly according to an embodiment of the present disclosure.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

During a process of inserting a male connector into a female connector, the indication state of an indicating component when the male connector is at some insertion positions is the same as the indication state when the male connector is inserted in place, resulting in an operator being unable to clearly identify whether the male connector is inserted in place.

In order to at least partially solve the above technical problem, according to a first aspect of the present disclosure, the present disclosure provides a female connector configured to receive and be fixedly connected to a male connector which includes a male connector recess on an outer side of the male connector. The female connector includes a female connector shell and a snap-fit fastener. The female connector shell defines a receiving channel extending in an axial direction of the female connector shell to receive the male connector in the axial direction, and includes a retaining channel and a locking channel which are in communication with the receiving channel and are located on opposite sides of the receiving channel. The snap-fit fastener is movably connected to the female connector shell and includes a retaining portion and a locking portion. The retaining portion is elastically deformable, and the retaining portion and the locking portion can enter the receiving channel through the retaining channel and the locking channel, respectively. The snap-fit fastener has a first position and a second position, and is movable between the first position and the second position in a radial direction of the female connector shell. The retaining portion can elastically deform under the action of the male connector to provide a force that drives the snap-fit fastener to move from the first position to the second position.

In some embodiments, when the female connector has not yet received the male connector, the snap-fit fastener is in the first position, and the retaining portion at least partially extends into the receiving channel through the retaining channel; and when the male connector is received by the female connector and is fixed in place in the female connector by the snap-fit fastener, the snap-fit fastener is in the second position, the male connector recess is aligned with the locking channel, the locking portion at least partially enters the male connector recess through the locking channel, and the retaining portion exits the receiving channel and abuts against the outer side of the male connector.

In some embodiments, when the male connector is received by the female connector but has not yet been fixed in place in the female connector, the snap-fit fastener is in the first position, and the retaining portion elastically deforms under the action of the male connector, and exits the receiving channel and abuts against the outer side of the male connector.

In some embodiments, the retaining portion includes a connecting end and a free end, the free end of the retaining portion being movable around the connecting end in a direction away from the receiving channel to elastically deform the retaining portion, and the free end of the retaining portion passing through the retaining channel and extending into the receiving channel.

In some embodiments, the retaining portion includes an engaging portion, and the female connector shell includes a mating portion, the engaging portion engaging with the mating portion to retain the snap-fit fastener in the first position when the female connector has not yet received the male connector.

In some embodiments, the engaging portion includes a hook portion, and the mating portion is formed by an edge of the retaining channel.

In some embodiments, the retaining portion includes a guiding surface provided at the free end, wherein the guiding surface is an inclined surface that extends obliquely relative to the radial direction of the female connector shell and is configured to guide the snap-fit fastener to move from the second position to the first position in the radial direction of the female connector shell.

In some embodiments, the mating portion of the female connector shell includes an inclined wall, a top portion of the inclined wall being an inclined surface complementary to the guiding surface.

In some embodiments, the retaining portion includes an inclined section, a bent section and a vertical section, the inclined section connecting the connecting end and the bent section and extending obliquely relative to the radial direction of the female connector shell, and the vertical section connecting the bent section and the free end and extending in the radial direction of the female connector shell.

In some embodiments, the snap-fit fastener further includes a cover portion located outside the retaining portion in the radial direction and outside the female connector shell; where the cover portion abuts against the female connector shell when the snap-fit fastener is in the first position, and the cover portion is a distance away from the female connector shell when the snap-fit fastener is in the second position.

In some embodiments, the female connector further includes an indicator detachably connected to the outer side of the female connector shell and including a receiving slot; wherein when the snap-fit fastener is in the first position, at least part of the snap-fit fastener extends into the receiving slot to prevent the indicator from being removed, and when the snap-fit fastener is in the second position, the snap-fit fastener exits the receiving slot to allow the indicator to be removed, so as to indicate that the male connector and the female connector are fixed in place.

In some embodiments, the indicator is slidably connected to the female connector shell in the axial direction.

According to a second aspect of the present disclosure, the present disclosure provides a connector assembly including a male connector and a female connector according to any one of the embodiments in the first aspect.

The "male connector" in the present disclosure refers to a connector for active insertion, and the "female connector" in the present disclosure refers to a connector for passive reception.

In the female connector and the connector assembly of the present disclosure, the fitting of the male connector and the female connector is implemented by the mating structures of the retaining portion and the locking portion of the female connector. The retaining portion can block the insertion path of the male connector, which does not need for the locking portion to block the insertion path of the male connector, so that the snap-fit fastener can move to the second position only after the male connector is inserted in place. Therefore, the snap-fit fastener in the first position can move to the second position only after the male connector and the female connector are fixed, and thus the appearance of the female connector is inconsistent before and after the male connector is mounted, so that it is possible to visually determine whether the male connector and the female connector are fixed.

Other objectives and advantages of the present disclosure will be apparent from the following description of the present disclosure with reference to the drawings, which can contribute to a comprehensive understanding of the present disclosure.

Figure 1B:
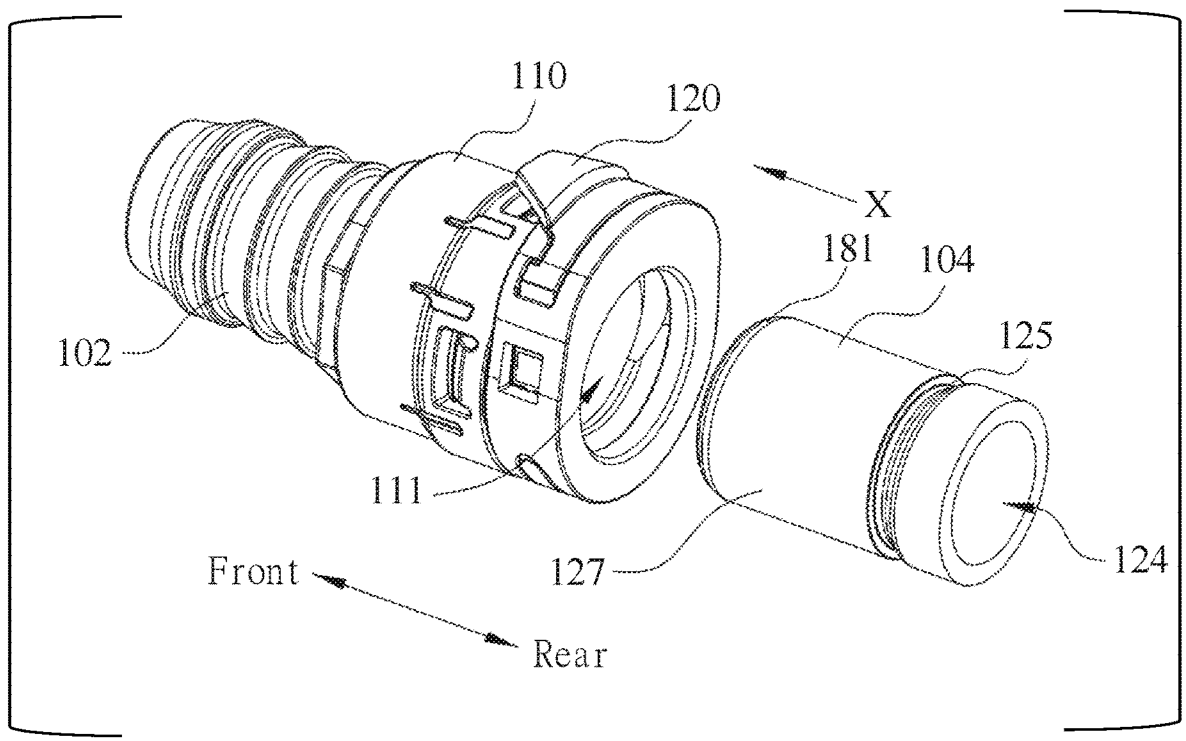
FIG. 1B is an exploded view of the connector assembly in FIG. 1A.

FIGS. 1A and 1B show a general structure of a connector assembly 100 which includes a female connector 102 according to an embodiment of the present disclosure. FIG. 1A shows a structural perspective view of a connector assembly 100 which includes a female connector 102 according to an embodiment of the present disclosure, and FIG. 1B is an exploded view of the connector assembly 100 in FIG. 1A, with a male connector 104 being separated from the female connector 102. As shown in FIGS. 1A and 1B, the connector assembly 100 includes a male connector 104 and a female connector 102. The female connector 102 includes a snap-fit fastener 120. The male connector 104 and the female connector 102 are fixedly connected by insertion, and are locked relative to each other by the snap-fit fastener 120. In this embodiment, the male connector 104 is partially inserted into the female connector 102, so as to achieve fluid communication between the male connector 104 and the female connector 102.

In this embodiment, the female connector 102 and the male connector 104 are substantially in the form of coaxially arranged cylinders and have a common axis i. For ease of description, in the present disclosure, a direction in which the axis i extends is set as an axial direction, a direction about the axis i is set as a circumferential direction, and a direction perpendicular to the axis i is set as a radial direction. The male connector 104 is inserted into a receiving channel 111 of the female connector 102 in the axial direction. A male connector channel 124 and the receiving channel 111 both extend in the axial direction. In some other embodiments, the male connector 104 and the female connector 102 may also be in any other shape, and may also be arranged non-coaxially. In addition, in the present disclosure, in the axial direction, a direction on the side where the female connector 102 is located is referred to as the front, and a direction on the side where the male connector 104 is located is referred to as the rear. A direction approaching the axis is referred to as the inside, and a direction away from the axis is referred to as the outside.

The male connector 104 is substantially in the form of a straight cylinder having a circular cross-section. In other embodiments, the male connector 104 may also be in the form of a bent tube or of a cylinder having other cross-sectional shapes. The male connector channel 124 is arranged inside the male connector 104. The male connector channel 124 runs through the male connector 104. An inwardly recessed male connector recess 125 is provided in an outer surface 127 of the male connector 104, and the male connector recess 125 is configured to receive a locking portion 232 (see FIG. 8B for further details) of the snap-fit fastener 120 of the female connector 102 to enable the male connector 104 and the female connector 102 to be fixedly connected and locked relative to each other. In this embodiment, the male connector recess 125 is in the form of a circular ring and is arranged around the outer circumference of the male connector 104. The male connector 104 has a guiding portion 181 at an end thereof that is inserted into the female connector 102 (see FIG. 4A for further details). The guiding portion 181 cooperates with a guiding surface 342 on a retaining portion 230 of the snap-fit fastener 120 to jointly guide the male connector 104 to be inserted between the snap-fit fastener 120 of the female connector 102 and drive the retaining portion 230 to elastically deform (see FIGS. 4B and 5B for further details). In this embodiment, the guiding portion 181 and the guiding surface 342 are inclined surfaces extending obliquely relative to the radial direction and have complementary shapes. When the male connector 104 is inserted into the female connector 102 under force, the guiding portion 181 and the guiding surface 342 generate, on the contact surface, a component force that drives the retaining portion 230 to elastically deform. In other embodiments, the guiding portion 181 and the guiding surface 342 may also be of other shapes and structures.

The female connector 102 is substantially in the form of a straight cylinder having a circular cross-section. In order to adapt to different application environments, in other embodiments, the female connector 102 may also be in the form of a bent tube or of a cylinder having other cross-sectional shapes. The female connector 102 includes a female connector shell 110. The inner diameter of the female connector shell 110 of the female connector 102 at a proximal end for receiving the male connector 104 matches with the outer diameter of the male connector 104, such that the male connector 104 can be properly inserted into the female connector 102. In this embodiment, the female connector shell 110 is provided with an external thread on a distal end thereof such that the female connector 102 can be in threaded connection with an external pipe (not shown) by the external thread. In other embodiments, the female connector 102 may also be connected to the external pipe in other manners, for example, by a clamp, etc.

The female connector shell 110 defines a receiving channel 111 extending axially and running therethrough, so as to axially receive and fix the male connector 104 by the receiving channel 111. When the male connector 104 is axially inserted into the female connector 102 in an arrow direction x, the male connector channel 124 is in communication with the receiving channel 111 of the female connector shell 110, so as to enable fluid communication between the pipe connected to the male connector 104 and the pipe connected to the female connector 102.

Figure 2A:
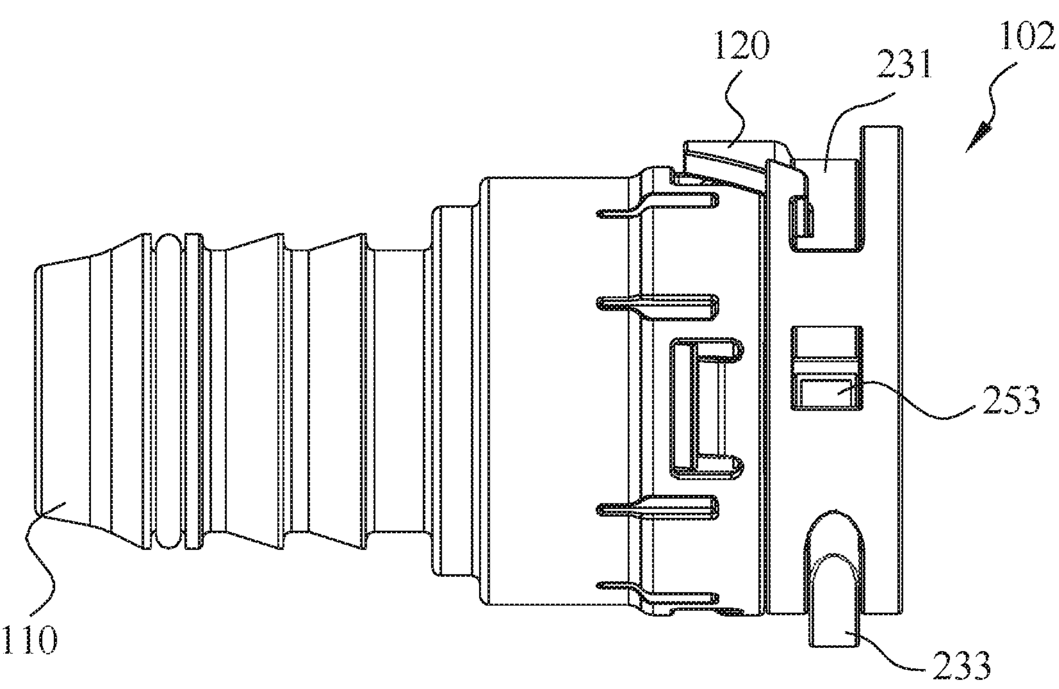
FIG. 2A is a side view of a female connector in FIG. 1A when a snap-fit fastener is in a first position.
Figure 2B:
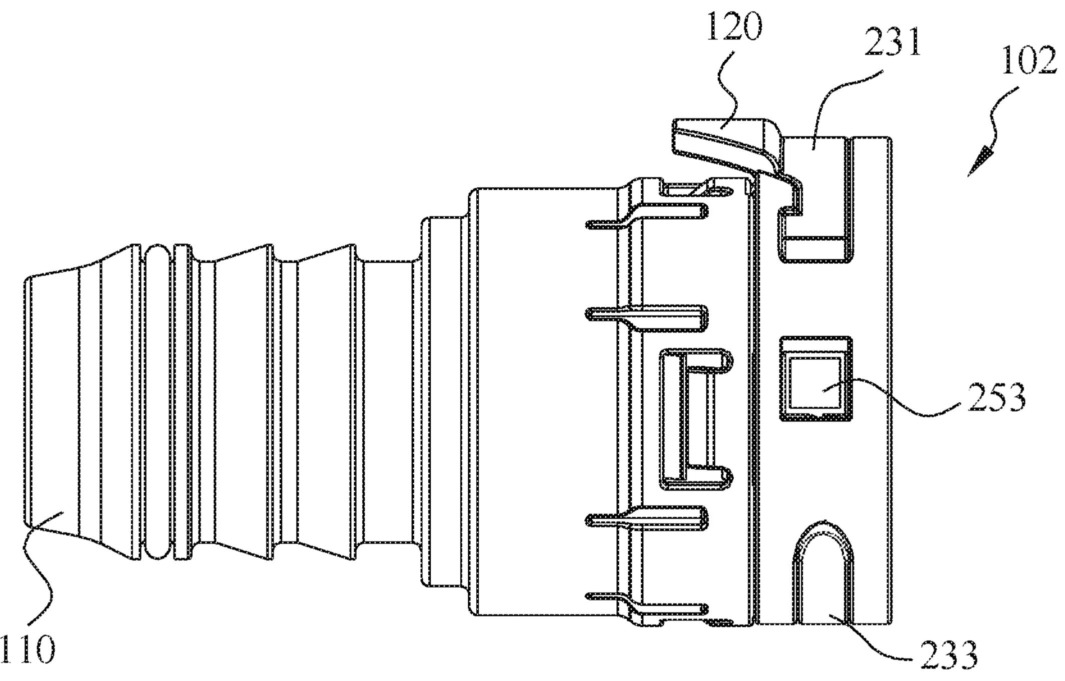
FIG. 2B is a side view of the female connector in FIG. 1A when the snap-fit fastener is in a second position.
Figure 2C:
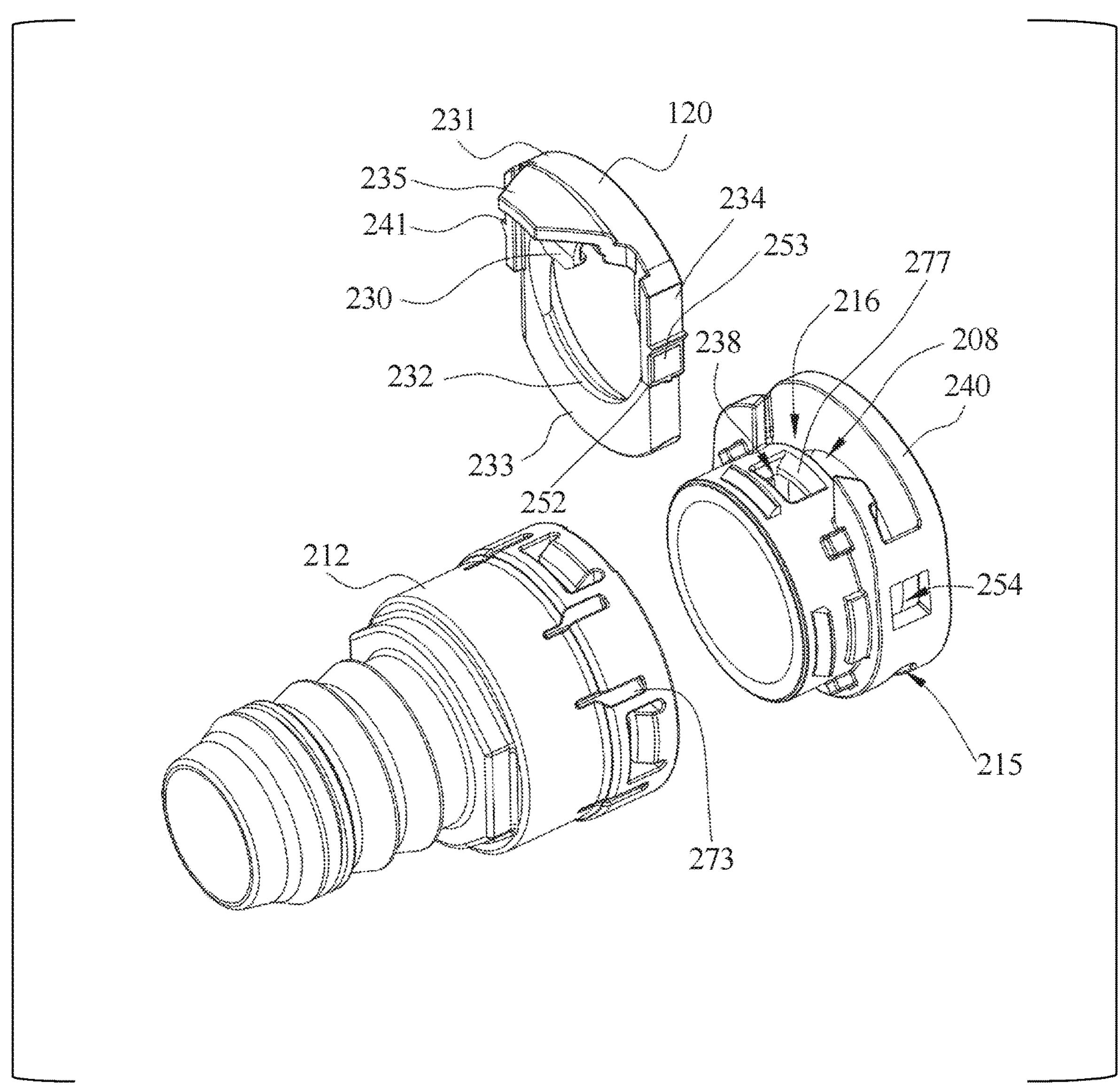
FIG. 2C is an exploded view of the female connector in FIG. 1A.

FIGS. 2A to 2C show a specific structure of the female connector 102. FIGS. 2A and 2B respectively show side views of the female connector 102 when the snap-fit fastener 120 is in a first position and when the snap-fit fastener 120 is in a second position, and FIG. 2C is an exploded view of the female connector 102 in FIG. 2A. As shown in FIGS. 2A to 2C, the female connector 102 includes the female connector shell 110 and the snap-fit fastener 120. The snap-fit fastener 120 is connected to a rear side of the female connector shell 110, i.e., the shell portion for inserting the male connector 104. In addition, the snap-fit fastener 120 can move relative to the female connector shell 110, and when the snap-fit fastener 120 moves to different positions, the snap-fit fastener 120 can implement different functions.

Specifically, the female connector shell 110 includes a retaining channel 238 and a locking channel 215. The retaining channel 238 and the locking channel 215 are located on opposite sides of the receiving channel 111 and in communication with the receiving channel 111. In this embodiment, the retaining channel 238 is located at the top of the female connector shell 110, and the locking channel 215 is located at the bottom of the female connector shell 110. More specifically, the female connector shell 110 includes a snap-fit slot 208, and the snap-fit fastener 120 can be inserted into the snap-fit slot 208 and move in the snap-fit slot 208, so that the snap-fit fastener 120 is movably connected to the female connector shell 110. The snap-fit slot 208 is arranged at the rear side of the female connector shell 110 and radially runs through the female connector shell 110, so as to form a top receiving opening 216 at the top of the female connector shell 110 and form the locking channel 215 at the bottom of the female connector shell 110. In this embodiment, the top receiving opening 216 and the locking channel 215 are both in the form of an opening to communicate the receiving channel 111 with the outside. In some other embodiments, the snap-fit slot 208 may not run through the entire female connector shell 110, and one of the top receiving openings 216 and the locking channel 215 is in the form of an opening to facilitate the insertion of the snap-fit fastener 120 into the snap-fit slot 208.

The snap-fit fastener 120 has a first position as shown in FIG. 2A and a second position as shown in FIG. 2B. The snap-fit fastener 120 includes a locking portion 232 arranged on an inner wall of a bottom portion thereof. In this embodiment, the snap-fit slot 208 extends in the radial direction of the female connector shell 110, that is, the snap-fit fastener 120 moves relative to the female connector shell 110 in the radial direction of the female connector shell 110 between the first position and the second position, for example, moving vertically. When the snap-fit fastener 120 is in the first position, the locking portion 232 of the snap-fit fastener 120 exits the receiving channel 111 to make way for the insertion path of the male connector 104, so that the snap-fit fastener 120 will not affect the insertion process of the male connector 104. When the snap-fit fastener 120 is in the second position, the locking portion 232 of the snap-fit fastener 120 can at least partially enter the receiving channel 111 through the locking channel 215, so as to lock the male connector 104 relative to the female connector 102 after the male connector 104 is in place, thereby maintaining the fixed connection between the male connector and the female connector.

The snap-fit fastener 120 further includes a retaining portion 230. The retaining portion 230 is connected to a top portion of the snap-fit fastener 120 and enters the receiving channel 111 through the retaining channel 238. The retaining portion 230 is elastically deformable, and can be in an initial state and elastically deform to a deformed state. In this embodiment, the retaining portion 230 includes an engaging portion, and the female connector shell 110 includes a mating portion. The engaging portion engages with the mating portion to retain the snap-fit fastener 120 in the first position when the female connector 102 has not yet received the male connector 104. The retaining portion 230 can elastically deform under the action of the male connector 104 to provide a force that drives the snap-fit fastener 120 to move from the first position to the second position. Specifically, when the male connector 104 has not yet been inserted into the female connector 102, the snap-fit fastener 120 is in the first position, the retaining portion 230 is in the initial state, and the retaining portion 230 at least partially extends into the receiving channel 111 through the retaining channel 238. When the male connector 104 is inserted into the female connector 102 but not yet in place, the locking portion 232 of the snap-fit fastener 120 abuts against the outer surface 127 of the male connector 104 so that the snap-fit fastener 120 is still in the first position. The outer surface 127 of the male connector 104 presses the retaining portion 230 so that the retaining portion 230 elastically deforms to a deformed state, and the retaining portion 230 is pushed out of the receiving channel 111. The retaining portion 230 abuts against the outer side of the male connector 104 and provides an upward restoring force to the snap-fit fastener 120. When the male connector 104 is inserted into the female connector 102 and in place, the male connector recess 125 of the male connector 104 is aligned with the locking channel 215. The snap-fit fastener 120 moves to the second position under the action of the restoring force, the locking portion 232 of the snap-fit fastener 120 is inserted into the male connector recess 125 of the male connector 104, and the retaining portion 230 is restored to the initial state, abuts against the outer side of the male connector 104, and exits the receiving channel 111. That is, the snap-fit fastener 120 is in the second position only when the male connector 104 is inserted into the female connector 102 and in place. When the male connector 104 has not yet been inserted into the female connector 102 or has not yet been inserted in place, the snap-fit fastener 120 is in the first position.

More specifically, in this embodiment, the snap-fit fastener 120 is ring shaped, and includes a top portion 231, a bottom portion 233 and a pair of side portions 234 which are connected to each other to form the snap-fit fastener 120. The top portion 231 and the bottom portion 233 are arranged oppositely, and the pair of side portions 234 are arranged oppositely and are connected substantially vertically between the top portion 231 and the bottom portion 233. The snap-fit fastener 120 further includes a cover portion 235. The cover portion 235 is located outside the retaining portion 230 in the radial direction and outside the female connector shell 110. In this embodiment, the cover portion 235 extends substantially axially forward from a front edge of the top portion 231. The cover portion 235 protrudes from the top portion 231. Such a configuration enables the cover portion 235 to protect the retaining portion 230 from above, and can facilitate an operator to press the cover portion 235 to assist in the deformation of the retaining portion 230. Further, as shown in FIGS. 2A and 2B, when the snap-fit fastener 120 is in the first position, the top portion 231 and the bottom portion 233 of the snap-fit fastener 120 are both lower than the adjacent outer surface of the female connector shell 110 and at a certain distance from the adjacent outer surface of the female connector shell 110, and the cover portion 235 abuts against the outer surface of the female connector shell 110 to prevent the snap-fit fastener 120 from disengaging downward from the snap-fit slot 208. When the snap-fit fastener 120 is in the second position, the top portion 231 and the bottom portion 233 of the snap-fit fastener 120 are substantially flush with the adjacent portions of the outer surface of the female connector shell 110, and the cover portion 235 is a distance away from the female connector shell 110. Therefore, it can be visually shown that the snap-fit fastener 120 is in the first position or in the second position. Those skilled in the art will appreciate that, in other embodiments, the snap-fit fastener 120 may not be ring shaped but may have a notch, as long as the movement of the snap-fit fastener 120 is not affected.

The locking portion 232 is arranged on the inner wall of the bottom portion 233. In this embodiment, the locking portion 232 protrudes from the inner wall of the bottom portion 233 into the receiving channel 111, for example, protrudes radially. In other embodiments, the locking portion 232 may also include two or more projections protruding into the receiving channel 111. At least one of the pair of side portions 234 includes a boss 252 protruding outward from an outer surface of the side portion 234, and the boss 252 has an identification area 253 in which an identifier is provided. In the present disclosure, the identifier may be an identification code, such as a two-dimensional code or a trademark. The boss 252 of the snap-fit fastener 120 is further provided with at least one projection 241 further protruding outward, and the projection 241 fits with a window 254 of the female connector shell 110 to restrict the radial movement of the snap-fit fastener 120 and prevent the snap-fit fastener 120 from disengaging from the snap-fit slot 208 from above.

The female connector shell 110 includes a body 212 and a connecting base 240. The body 212 is configured to provide a connecting structure for connection with an external pipe, and the connecting base 240 is configured to provide a connecting structure for receiving and fixing the male connector 104. The body 212 and the connecting base 240 are detachably connected together, for example, by corresponding snap-fit structures provided at the rear side of the body 212 and at the front side of the connecting base 240, thereby facilitating the machining of the female connector shell 110. The snap-fit slot 208 is provided at the rear side of the connecting base 240 and runs radially through the connecting base 240. In some embodiments, at least one sealing ring, such as one sealing ring 471 (see FIG. 4B), is provided between the body 212 and the connecting base 240 to prevent leakage of fluid from the snap-fit structures.

The retaining channel 238 is provided in the connecting base 240 at a front side of the top receiving opening 216, and the mating portion is formed by an edge of the retaining channel 238. When the snap-fit fastener 120 is inserted into the snap-fit slot 208, the top portion 231 is at least partially located in the top receiving opening 216, the bottom portion 233 is at least partially located in the locking channel 215, and the retaining portion 230 is at least partially located in the retaining channel 238. In this embodiment, the retaining channel 238 is substantially in the form of a square window. The mating portion includes an inclined wall 277 arranged at a rear edge of the retaining channel 238. The inclined wall 277 extends obliquely forward and inward from the outer surface of the connecting base 240. The inclined wall 277 matches with the retaining portion 230 in shape, and the top portion of the inclined wall 277 is an inclined surface complementary to the guiding surface 342 of the retaining portion 230 (see FIG. 6B), so that the inclined wall 277 is configured to abut against different parts of the retaining portion 230 when the snap-fit fastener 120 moves radially between the first position and the second position. This will be described in detail below with reference to the specific structure of the retaining portion 230. Those skilled in the art will appreciate that, in other embodiments, the mating portion may also be of other structures, as long as the structure of the engaging portion is configured accordingly.

The connecting base 240 further includes at least one window 254. The window 254 is substantially square, is shaped and sized to substantially match with the projection 241 of the snap-fit fastener 120, and is positioned corresponding to the identification area 253 on the boss 252. The window 254 is in communication with the snap-fit slot 208. When the snap-fit fastener 120 is in the second position, the entire identifier on the identification area 253 can be exposed from the window 254; and when the snap-fit fastener 120 is in the first position, the identifier on the identification area 253 is at least partially blocked by the connecting base 240. When the identifier is a two-dimensional code, an operator can scan the two-dimensional code to determine whether the entire two-dimensional code is exposed. Such a configuration enables a customer to confirm whether the snap-fit fastener 120 is in the second position when the male connector 104 is inserted into the female connector 102 and thus confirm whether the male connector 104 is mounted in place.

In the embodiments of the present disclosure, the male connector 104 and the female connector 102 are both made of a non-metallic material, so that the connector assembly 100 can be used in corrosive environments such as seawater and deserts. That is, the female connector shell 110 and the snap-fit fastener 120 are made of a non-metallic material, such as plastic or rubber. In this embodiment, the female connector shell 110 and the snap-fit fastener 120 are both made of plastic by a molding process. Thus, the snap-fit fastener 120 can ensure the strength of the fixed connection between the male connector 104 and the female connector 102, and the retaining portion 230 may have a certain elasticity. In addition, the molding process facilitates machining.

In some embodiments, a plurality of mounting slots 273 spaced apart in the circumferential direction are further provided on the outer surface of the body 212. The mounting slots 273 are recessed inward from the outer surface of the body 212, and each mounting slot 273 extends axially. An indicator may be connected outside of the body 212 through the mounting slots 273 (see the embodiment shown in FIGS. 9A to 9C).

Figures 3A, 3B:
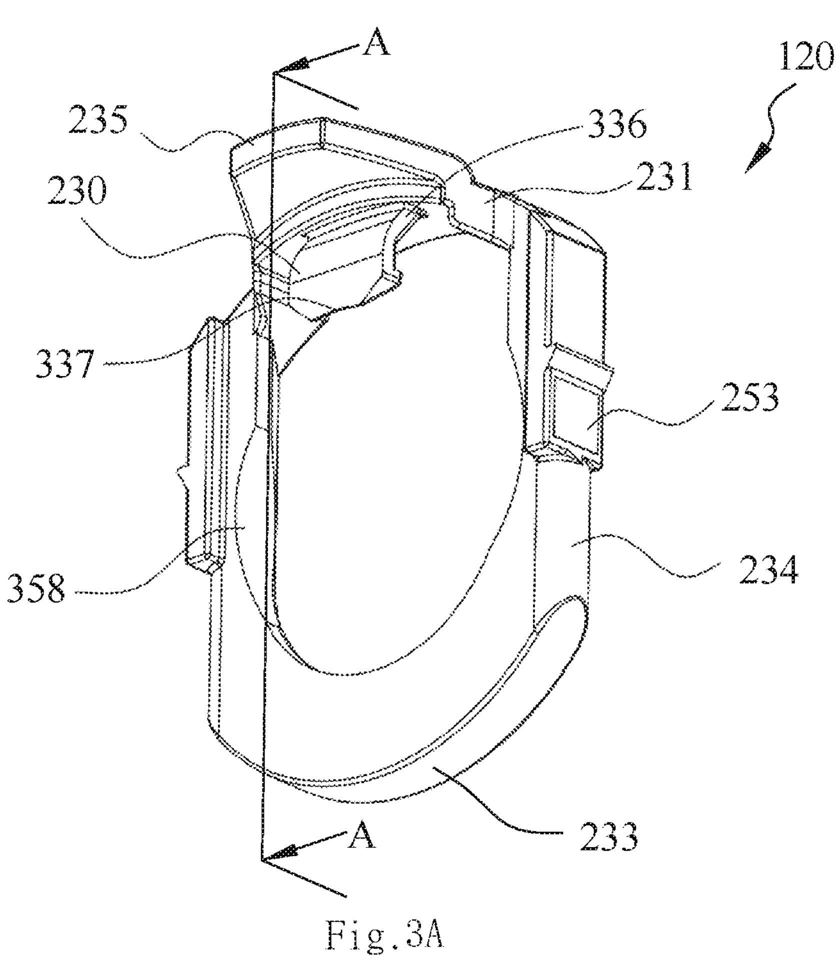
FIG. 3A is a structural perspective view of a snap-fit fastener in FIG. 1A.
FIG. 3B is a cross-sectional view of the snap-fit fastener shown in FIG. 3A along line A-A.

FIGS. 3A and 3B show a more specific structure of the snap-fit fastener 120. FIG. 3A is a structural perspective view of the snap-fit fastener 120 from a bottom view, and FIG. 3B is a cross-sectional view of the snap-fit fastener 120 shown in FIG. 3A along line A-A, with a dashed line frame showing a partial enlarged view of the snap-fit fastener 120 at the retaining portion 230. As shown in FIGS. 3A and 3B, in the axial direction, the snap-fit fastener 120 has a certain thickness to ensure the strength of the snap-fit fastener 120 made of plastic.

The locking portion 232 is shaped to substantially match with the male connector recess 125 of the male connector 104, so that the locking portion 232 can be inserted into the male connector recess 125. The locking portion 232 has a protruding height such that, when the snap-fit fastener 120 is in the first position, the locking portion 232 is substantially flush with the inner wall of the receiving channel 111 or lower than the inner wall of the receiving channel 111, which does not affect the insertion of the male connector 104 into the female connector 102; and when the male connector 104 and the female connector 102 are mounted in place, the snap-fit fastener 120 is in the second position, and the locking portion 232 can protrude from the inner wall of the receiving channel 111 and extend into the receiving channel 111, and thus be inserted into the male connector recess 125 of the male connector 104 to achieve fixed connection between the male connector 104 and the female connector 102.

A recess 358 is formed in the inner wall of each of the pair of side portions 234 of the snap-fit fastener 120. The recess 358 is recessed from the inner surface of the side portion 234. The recess 358 is shaped such that, when the snap-fit fastener 120 moves vertically between the first position and the second position, the side portions 234 will not block the insertion of the male connector 104 but will make way for the insertion path of the male connector 104. In this embodiment, the outer contours of the recess 358 and of the locking portion 232 (i.e., the inner contour of the snap-fit fastener 120) are substantially in a shape, such as a circular shape, matching with the outer surface of the male connector 104.

The retaining portion 230 is connected below the inner surface of the front side of the top portion 231 of the snap-fit fastener 120, and extends forward and downward from the inner surface of the top portion 231. In this embodiment, the retaining portion 230 is an integrally formed sheet-shaped elastic piece, and the restoring force is provided by the elastic deformation of the elastic piece. Those skilled in the art will appreciate that, in other embodiments, the retaining portion may also be a separately formed assembly, as long as the retaining portion is elastic and can enter or exit the receiving channel 111. In addition, in other embodiments, the retaining portion may be provided separately from the snap-fit fastener, as long as a restoring force is provided to enable the snap-fit fastener to move to the second position.

The retaining portion 230 includes a connecting end 336 and a free end 337. The free end 337 can move around the connecting end 336 in a direction away from the receiving channel 111 to elastically deform, and the free end 337 can pass through the retaining channel 238 and extend into the receiving channel 111. In this embodiment, the free end 337 moves forward and outward. Specifically, in this embodiment, the retaining portion 230 includes an inclined section 344, a bent section 343, and a vertical section 345. The inclined section 344 and the vertical section 345 are connected to each other at the bent section 343. The inclined section 344 is connected to the connecting end 336, and the vertical section 345 is connected to the free end 337. The inclined section 344 connects the connecting end 336 and the bent section 343, and extends obliquely relative to the radial direction. The vertical section 345 connects the bent section 343 and the free end 337, and extends in the radial direction. In this embodiment, the inclined section 344 extends downward (i.e., inward) from the connecting end 336 to the bent section 343 obliquely relative to the radial direction. In some embodiments, the inclined section 344 has an angle of inclination consistent with an angle of inclination of the inclined wall 277 of the female connector shell 110, so as to abut against the inclined wall 277 when the snap-fit fastener 120 is in the first position and the retaining portion 230 is in the initial state. The vertical section 345 extends substantially radially and vertically downward (i.e., inward) from the bent section 343 to the free end 337. Therefore, in the radial direction, the free end 337 is a certain distance from the connecting end 336, so as to ensure that the free end 337 can extend into the receiving channel 111 when the distance between the top portion 231 of the snap-fit fastener 120 and the female connector shell 110 is limited. In the axial direction, the free end 337 is located at the front side of the connecting end 336 to enable the free end 337 to deform forward around the connecting end 336. When the free end 337 is subjected to a forward pushing force, the retaining portion 230 may elastically deform at the bent section 343 in addition to elastically deforming around the connecting end 336. By providing two deformable parts on the retaining portion 230, the pushing force required for deforming the retaining portion 230 can be further reduced.

The retaining portion 230 includes a guiding surface 342 arranged at the free end 337, and the guiding surface 342 is an inclined surface extending obliquely relative to the radial direction. In some embodiments, the guiding surface 342 is also configured to be an inclined surface that is complementary to the top portion of the inclined wall 277. In this embodiment, the guiding surface 342 is arranged at the front side of the bottom portion of the vertical section 345. When the retaining portion 230 is in the initial state, during the process of the male connector 104 being inserted forward into the receiving channel 111, the male connector 104 applies a forward pushing force to the free end 337 of the retaining portion 230, and the pushing force generates, on the guiding portion 181 of the male connector 104 and on the guiding surface 342 of the retaining portion 230, a component force that pushes the retaining portion 230 to elastically deform, so as to enable the retaining portion 230 to elastically deform around the connecting end 336 and enable the free end 337 to move upward (i.e., outward) to exit the receiving channel 111. When the retaining portion 230 is in the initial state, during the process of removing the male connector 104, when the operator applies a downward pressing force to the snap-fit fastener 120, a component force that drives the retaining portion 230 to elastically deform can be generated at the position where the guiding surface 342 is in contact with the inclined wall 277 to guide the retaining portion 230 to elastically deform, so as to enable the snap-fit fastener 120 to move from the second position to the first position.

The engaging portion of the retaining portion 230 includes a hook portion 346. The hook portion 346 protrudes axially from a front side wall of the vertical section 345. The hook portion 346 is configured to engage with a mating portion of the female connector shell 110, that is, engage with an edge of the retaining channel 238. When the retaining portion 230 is in the initial state and the snap-fit fastener 120 is in the first position, the hook portion 346 hooks the front edge of the retaining channel 238 to prevent the snap-fit fastener 120 from sliding upward and disengaging from the snap-fit slot 208. Thus, the cover portion 235 of the snap-fit fastener 120 and the hook portion 346 of the retaining portion 230 can jointly retain the snap-fit fastener 120 at the first position.

In this embodiment, the retaining portion 230 is shaped and sized to match with the retaining channel 238. In this embodiment, the retaining portion 230 has a width within a certain range. When the width is too large, the elasticity of the retaining portion 230 is insufficient, and when the width is too small, the service life of the elastic piece is affected.

In the retaining portion 230 of the present disclosure, the structure combining the inclined section 344 and the vertical section 345 can ensure that the elastic deformation of the retaining portion 230 has a sufficient radial deformation dimension and does not have an excessively large axial deformation dimension.

FIGS. 4A, 4B, 5A, 5B, 6A and 6B show a mounting process of inserting the male connector 104 into the female connector 102. In FIGS. 4A, 4B, 5A and 5B, the snap-fit fastener 120 is in the first position; and in FIGS. 6A and 6B, the snap-fit fastener 120 is in the second position.

Figures 4A, 4B:
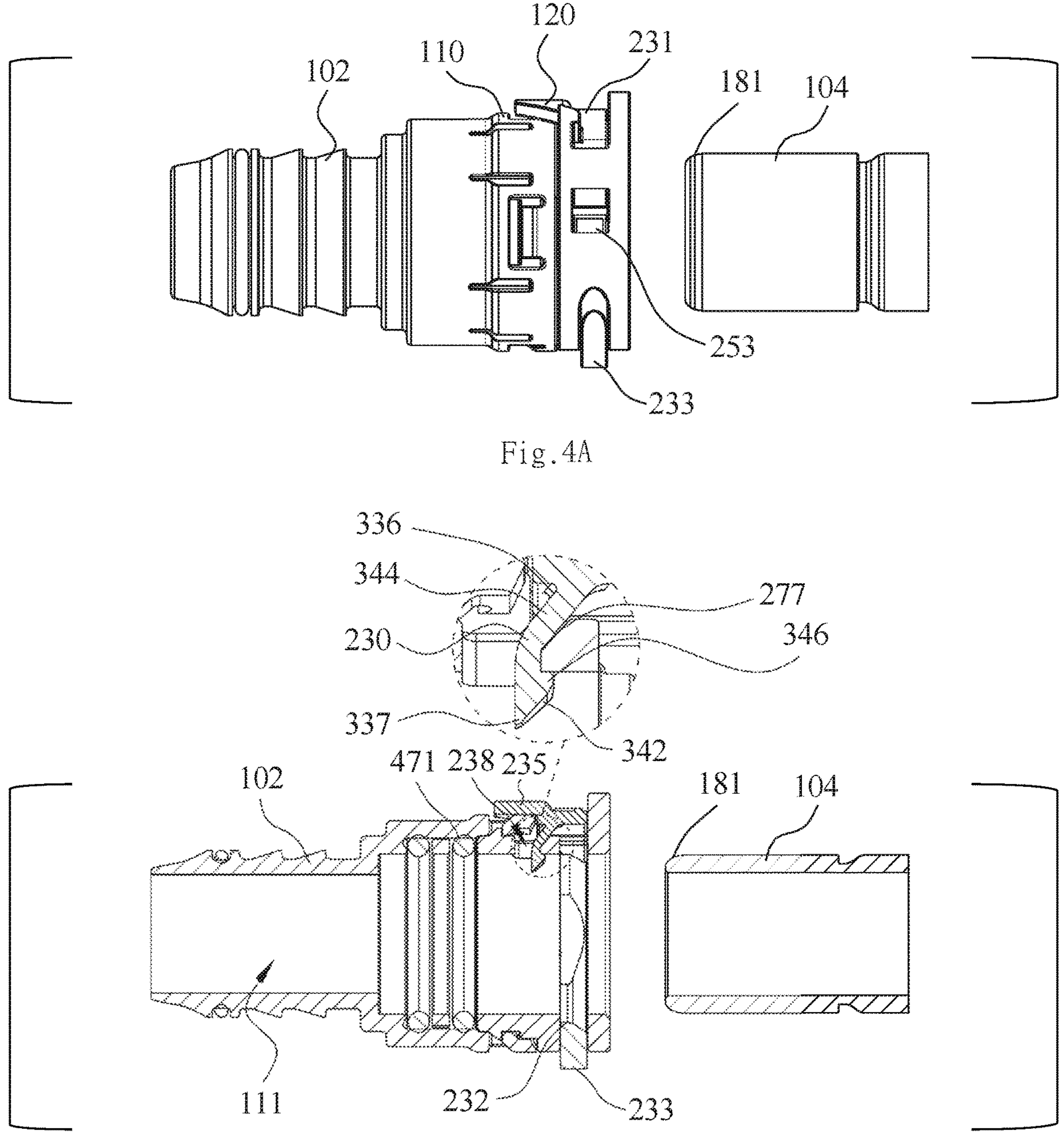
FIGS. 4A and 4B show a mating structure of the connector assembly when a male connector is not inserted.

FIGS. 4A and 4B show a mating structure of the connector assembly 100 when the male connector 104 has not yet been inserted into the female connector 102. FIG. 4A shows a side view of the connector assembly 100, and FIG. 4B shows an axial cross-sectional view of the connector assembly 100 at the retaining portion 230. As shown in FIGS. 4A and 4B, when the male connector 104 has not yet been inserted into the female connector 102, the snap-fit fastener 120 is in the first position. The top portion 231 and the bottom portion 233 of the snap-fit fastener 120 are both lower than the outer surface of the female connector shell 110. The locking portion 232 of the snap-fit fastener 120 exits the receiving channel 111 and is located in the locking channel 215. That is, the locking portion 232 is not located in the insertion path of the male connector 104. In this case, the retaining portion 230 is in an initial state. The free end 337 of the retaining portion 230 extends into the receiving channel 111 through the retaining channel 238, the hook portion 346 of the retaining portion 230 hooks the front edge of the retaining channel 238, and the inclined section 344 abuts against the inclined wall 277 of the female connector shell 110. In addition, the cover portion 235 of the snap-fit fastener 120 abuts against the outer surface of the female connector shell 110. In this case, the identifier on the identification area 253 of the snap-fit fastener 120 is at least partially blocked by the female connector shell 110.

As the operator inserts the male connector 104 leftward from the right end of the female connector 102 (i.e., forward from the rear end of the female connector 102) into the receiving channel 111 of the female connector 102, the male connector 104 moves axially forward relative to the female connector 102, and the guiding portion 181 of the male connector 104 comes into contact the guiding surface 342 of the retaining portion 230 and then pushes the free end 337 of the retaining portion 230 to elastically deform forward and upward around the connecting end 336, so that the free end 337 exits the receiving channel 111 to make way for the insertion path of the male connector 104. In addition, since the snap-fit fastener 120 is in the first position, the locking portion 232 will not block the insertion of the male connector 104, so that the male connector 104 can reach the position shown in FIGS. 5A and 5B.

Figure 5A:
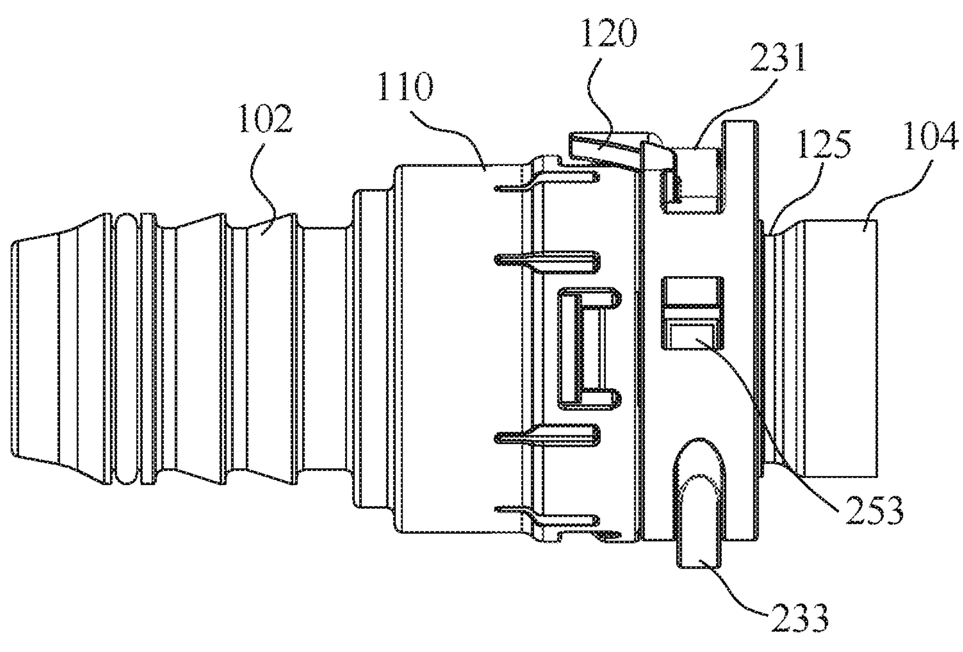
FIGS. 5A and 5B show the mating structure of the connector assembly during the insertion of the male connector.
Figure 5B:
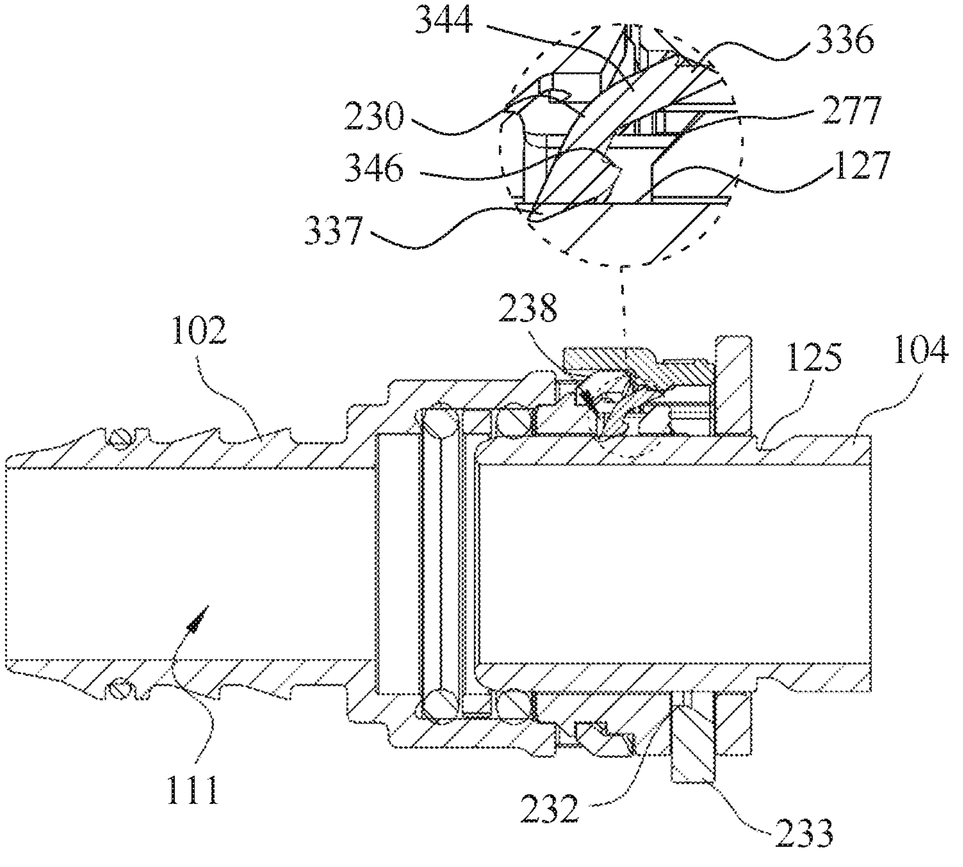

FIGS. 5A and 5B show the mating structure of the connector assembly 100 when the male connector 104 is inserted into the female connector 102 but has not yet been in place. FIG. 5A shows a side view of the connector assembly 100, and FIG. 5B shows an axial cross-sectional view of the connector assembly 100 at the retaining portion 230. As shown in FIGS. 5A and 5B, since the outer contours of the recess 358 and the locking portion 232 of the snap-fit fastener 120 (i.e., the inner contour of the snap-fit fastener 120) match with the outer contour of the outer surface 127 of the male connector 104, during the process of inserting the male connector 104 into the female connector 102, although the male connector 104 pushes the retaining portion 230 to elastically deform, the snap-fit fastener 120 is blocked by the outer surface 127 of the male connector 104, and thus does not change in position and still remain in the first position. In this case, the retaining portion 230 is pushed by the male connector 104 to elastically deform, the free end 337 of the retaining portion 230 elastically deforms forward and upward around the connecting end 336, and the free end 337 exits the receiving channel 111 and reaches a position on the front side within the retaining channel 238. The hook portion 346 is away from the front edge of the retaining channel 238, and the inclined section 344 is also away from the inclined wall 277. Under the elastic force of the retaining portion 230, the free end 337 still abuts against the outer surface 127 of the male connector 104 and applies a restoring force to the snap-fit fastener 120 for upward movement, so that the snap-fit fastener 120 tends to move upward to the second position. In this case, the identifier on the identification area 253 of the snap-fit fastener 120 is still at least partially blocked by the female connector shell 110.

Those skilled in the art will appreciate that, in some embodiments, there may be a certain gap between the male connector 104 and the inner contour of the snap-fit fastener 120, so that the snap-fit fastener 120 may move slightly upward but cannot reach the second position.

Figure 6A:
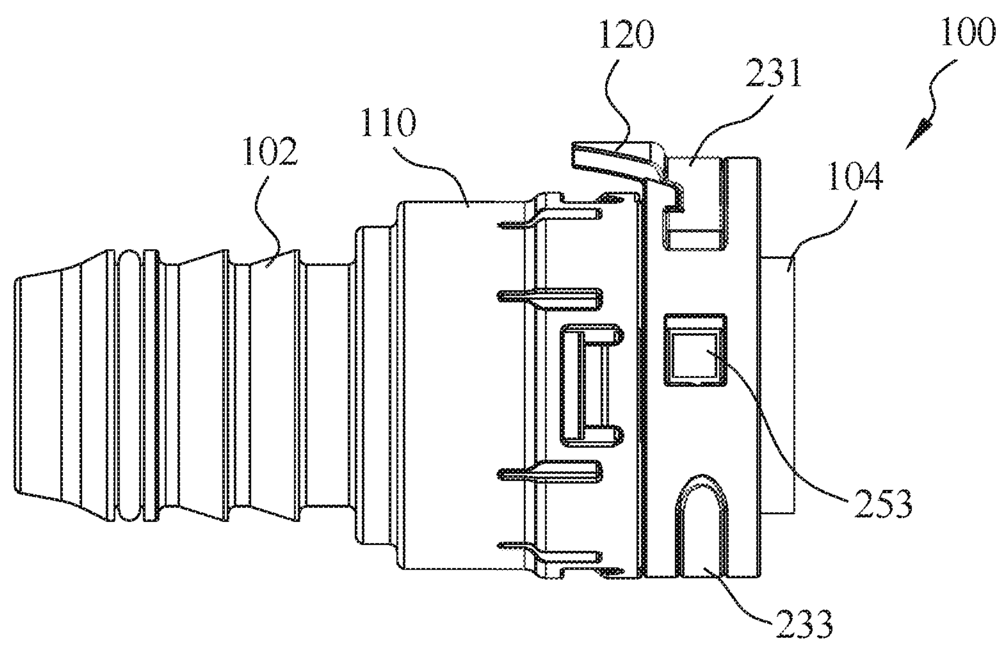
FIGS. 6A and 6B show the mating structure of the connector assembly after the male connector is inserted in place.
Figure 6B:
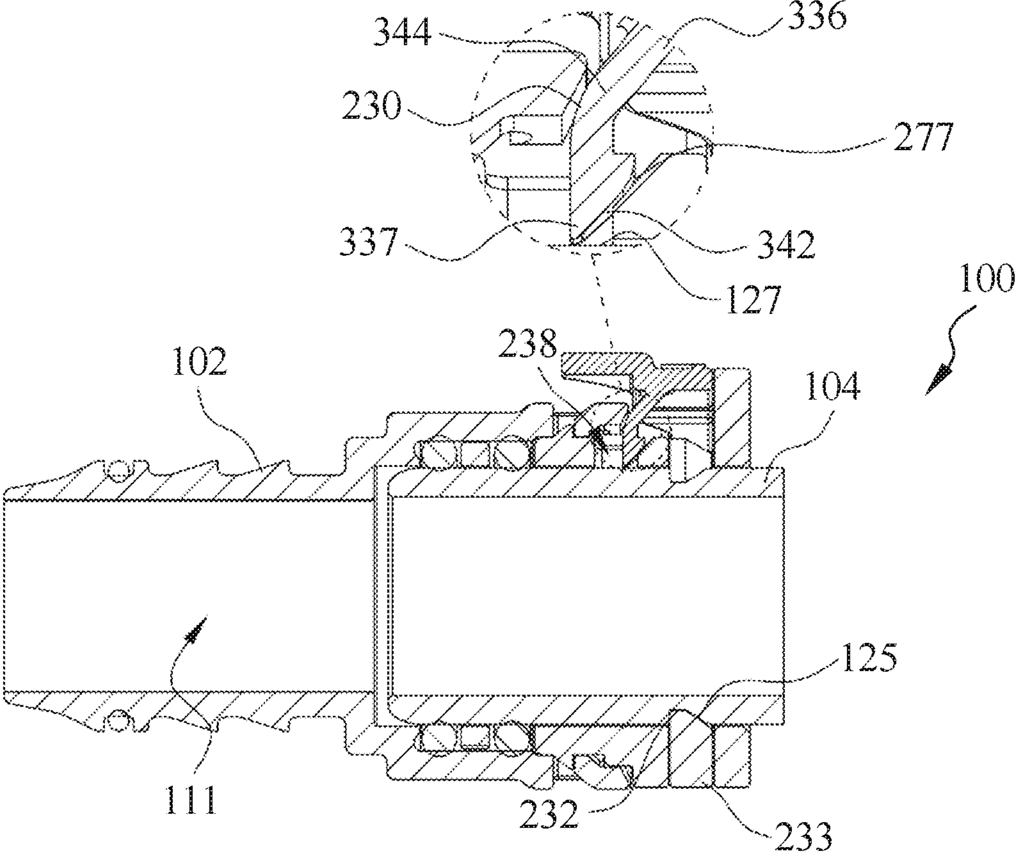

As the operator continues to insert the male connector 104 leftward into the receiving channel 111 of the female connector 102 until the male connector recess 125 of the male connector 104 is aligned with the locking channel 215 of the female connector 102, the male connector 104 reaches the position shown in FIGS. 6A and 6B.

FIGS. 6A and 6B show the mating structure of the connector assembly 100 when the male connector 104 is inserted in place and the male connector 104 is fixedly connected to the female connector 102. FIG. 6A shows a side view of the connector assembly 100, and FIG. 6B shows an axial cross-sectional view of the connector assembly 100 at the retaining portion 230. As shown in FIGS. 6A and 6B, the male connector 104 and the female connector 102 are mounted in place, and the male connector recess 125 of the male connector 104 is aligned with the locking channel 215 of the female connector 102. The locking portion 232 is no longer blocked by the outer surface 127 of the male connector 104, so that the snap-fit fastener 120 can move upward to the second position under the action of the restoring force of the retaining portion 230. The top portion 231 and bottom portion 233 of the snap-fit fastener 120 are substantially flush with the outer surface of the female connector shell 110, and the locking portion 232 of the snap-fit fastener 120 is inserted into the male connector recess 125 of the male connector 104 through the locking channel 215, so as to lock the male connector 104 and the female connector 102 relative to each other. In this case, the retaining portion 230 is restored to the initial state, and the free end 337 of the retaining portion 230 moves backward and upward around the connecting end 336, so that the free end 337 is received at a position on the rear side in the retaining channel 238, the inclined section 344 is away from the retaining channel 238, and the guiding surface 342 abuts against the inclined wall 277 of the female connector shell 110. The free end 337 abuts against the outer surface 127 of the male connector 104, so that the retaining portion 230 and the locking portion 232 jointly retain the snap-fit fastener 120 in the second position. In this case, as the snap-fit fastener 120 moves to the second position, the entire identifier on the identification area 253 of the snap-fit fastener 120 is exposed.

In the present disclosure, when the male connector 104 is not inserted into the female connector 102 or is not inserted in place, the snap-fit fastener 120 is in the first position, and the snap-fit fastener 120 can reach the second position only when the male connector 104 is inserted into the female connector 102 and in place. Therefore, the operator can visually determine the position and state of the male connector 104 relative to the female connector 102 on the basis of the position of the snap-fit fastener 120. In some embodiments, the operator can visually check whether the outer surface of the bottom portion 233 of the snap-fit fastener 120 is flush with the bottom of the female connector shell 110 to determine whether the snap-fit fastener 120 is in the second position, and thus determine whether the male connector 104 is inserted in place. In some embodiments, it is also possible to determine whether the entire identifier on the identification area 253 is exposed to determine whether the male connector 104 is inserted in place.

When the assembled connector assembly 100 needs to be disassembled, the connector assembly can be disassembled according to the sequence as shown in FIGS. 6A, 6B, 5A, 5B, 4A and 4B. Specifically, the operator presses the cover portion 235 of the snap-fit fastener 120 to enable the retaining portion 230 to elastically deform to a deformed state, the snap-fit fastener 120 can move to the first position, the locking portion 232 of the snap-fit fastener 120 exits the male connector recess 125 of the male connector 104, and then the male connector 104 can be pulled out from the female connector 102.

Figures 7A, 7B:
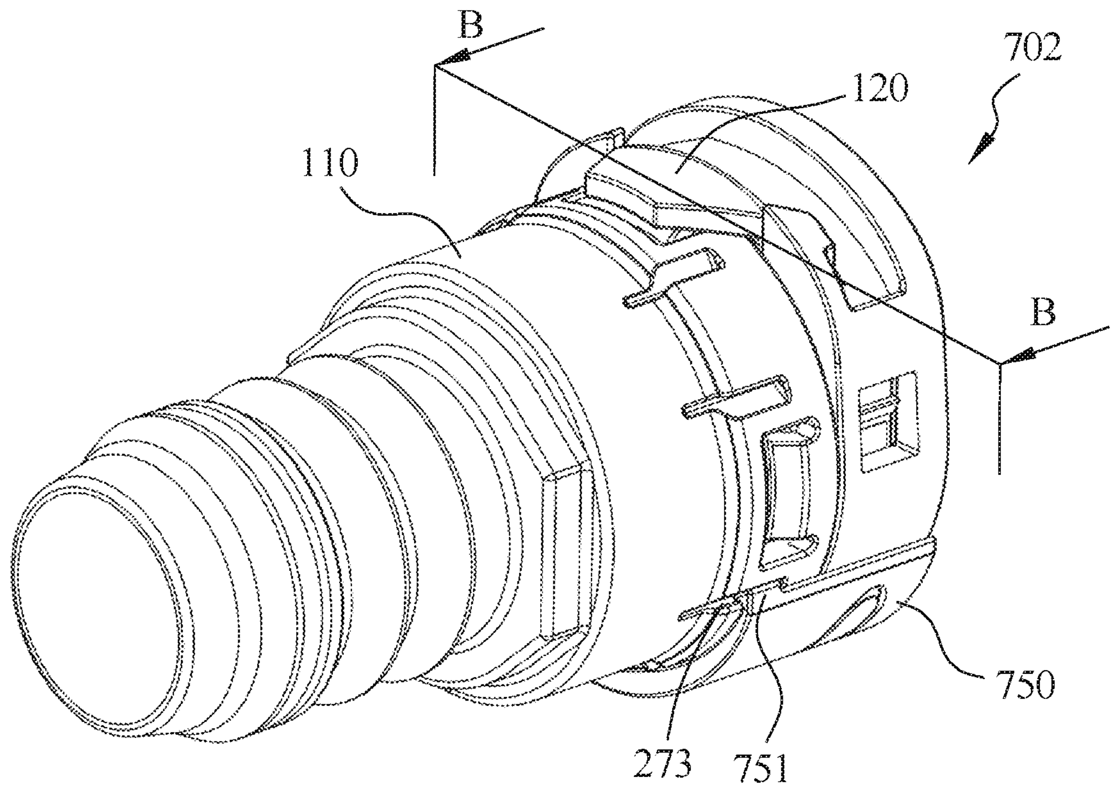
FIG. 7A shows a structural perspective view of a female connector according to another embodiment of the present disclosure.
FIG. 7B shows a cross-sectional view of the female connector shown in FIG. 7A along line B-B.
Figure 7C:
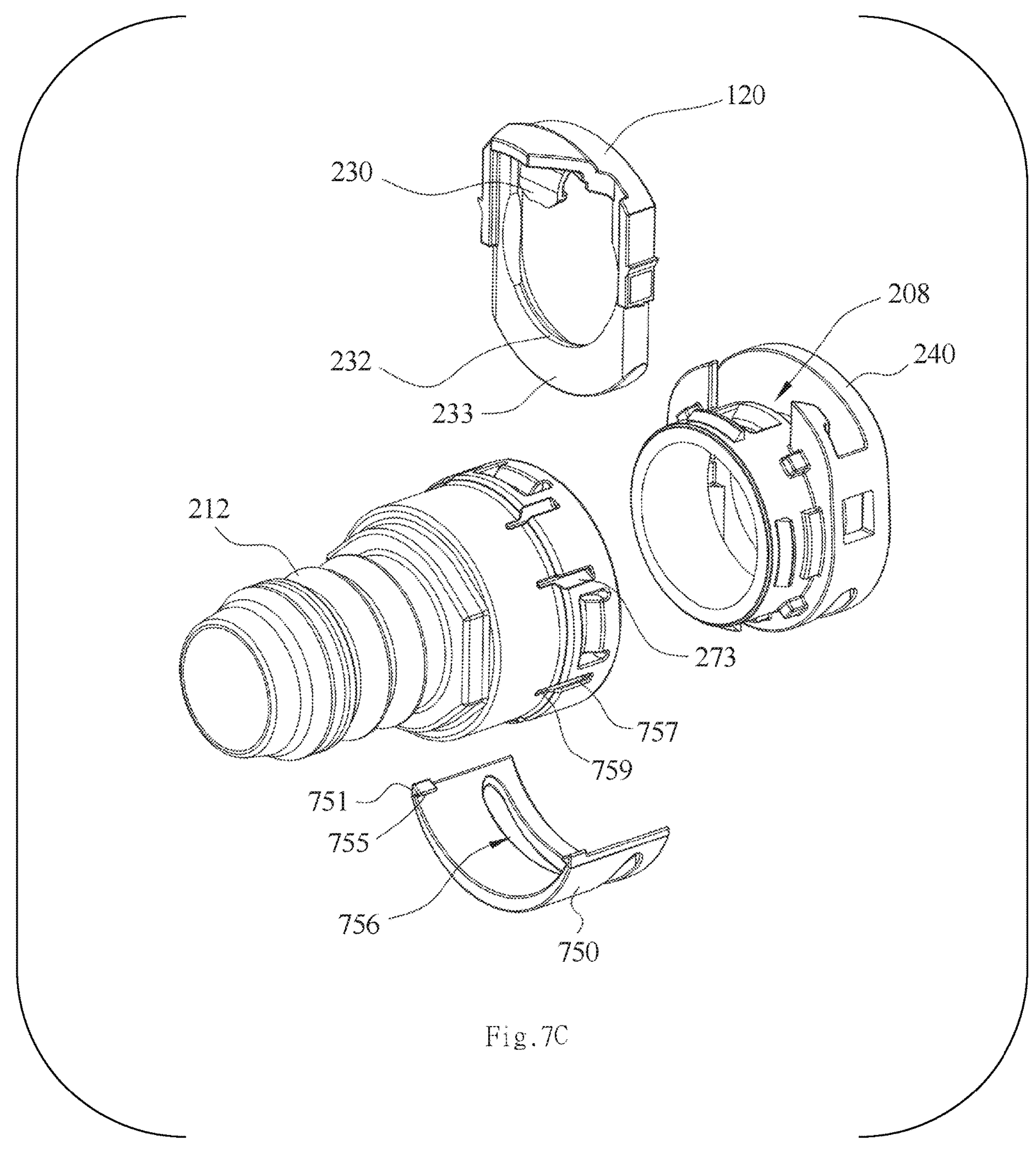
FIG. 7C shows an exploded view of the female connector shown in FIG. 7A.

FIGS. 7A to 7C show the specific structure of a female connector 702 according to another embodiment of the present disclosure. FIG. 7A shows a structural perspective view of the female connector 702, FIG. 7B shows a cross-sectional view of the female connector 702 at a mounting portion 751 of the indicator 750 along line B-B, and FIG. 7C shows an exploded view of the female connector 702. As shown in FIGS. 7A to 7C, the female connector 702 has a structure substantially the same as the structure of the female connector 102, and also includes a female connector shell 110 and a snap-fit fastener 120. The female connector shell 110 includes a body 212 and a connecting base 240 connected to each other. The snap-fit fastener 120 is inserted into the snap-fit slot 208 in the connecting base 240, and the snap-fit fastener 120 can move in the snap-fit slot 208 between the first position and the second position. The snap-fit fastener 120 includes a retaining portion 230 and a locking portion 232. The retaining portion 230 is elastically deformable. The locking portion 232 exits the receiving channel 111 when the snap-fit fastener 120 is in the first position, and extends into the receiving channel 111 when the snap-fit fastener 120 is in the second position. The structure of the female connector 702 substantially the same as that of the female connector 102 will not be repeated herein.

The difference between the female connector 702 and the female connector 102 lies in that the female connector 702 further includes an indicator 750. The indicator 750 is used for the operator to further confirm whether the male connector and the female connector are mounted in place. In this embodiment, the indicator 750 is detachably connected to the outer side of the female connector shell 110, for example, connected axially slidably to the outer side of the female connector shell 110. The indicator 750 includes a receiving slot 756. When the snap-fit fastener 120 is in the first position, at least part of the snap-fit fastener 120 extends into the receiving slot 756 to prevent the indicator 750 from being removed. When the snap-fit fastener 120 is in the second position, the snap-fit fastener 120 exits the receiving slot 756 to allow the indicator 750 to be removed, thereby indicating that the male connector and the female connector 702 are fixed in place. As an example, the indicator 750 is configured to be in the form of an arc piece that closely fits to the outer surface of the bottom of the female connector shell 110. The receiving slot 756 is located at the bottom of the indicator 750 and runs through the indicator 750. The receiving slot 756 is shaped and sized to match with the bottom portion 233 of the snap-fit fastener 120, so that when the snap-fit fastener 120 is in the first position, the bottom portion 233 of the snap-fit fastener 120 is received in the receiving slot 756, and the outer surface of the bottom portion 233 is flush with the outer surface of the bottom of the indicator 750.

The indicator 750 includes at least one mounting portion 751. The at least one mounting portion 751 is arranged at a rear end of the indicator 750, and the indicator 750 is connected to the female connector shell 110 by the at least one mounting portion 751. As a specific example, each mounting portion 751 includes a protrusion 755 protruding inward. In this embodiment, two mounting portions 751 are provided, and the two mounting portions 751 are respectively arranged at the rear end of the circumferential edge of the indicator 750. In other embodiments, other numbers of mounting portions 751 may be provided, or the mounting portions are arranged at other positions.

As described above, a plurality of mounting slots 273 spaced apart in the circumferential direction and extending axially are provided on the outer surface of the body 212. Each mounting slot 273 includes an engaging groove 757 and a disengaging groove 759 which are in communication with each other, and each disengaging groove 759 is located at the front side of the engaging groove 757 of the same disengaging groove 759. The engaging grooves 757 and the disengaging grooves 759 all extend axially, but the disengaging grooves 759 have smaller depths than the engaging grooves 757. The engaging grooves 757 are shaped to match with the protrusions 755 of the mounting portions 751, so that the protrusions 755 of the mounting portions 751 can engage with the engaging grooves 757 of two of the plurality of mounting slots 273. In this embodiment, each protrusion 755 is substantially in the form of a hook protruding inclined to the radial direction, and each engaging groove 757 is an inclined slot inclined to the radial direction.

Thus, the indicator 750 can be connected to the outer side of the bottom of the female connector shell 110, and under the restriction of the engaging grooves 757, the indicator 750 can only move axially, but cannot move circumferentially or radially. When the mounting portions 751 of the indicator 750 moves axially forward to the disengaging grooves 759, since the disengaging grooves 759 have smaller depths than the engaging grooves 757, the indicator 750 can be removed from the female connector shell 110 from below. In this embodiment, the outer diameter of the body 212 at the engaging grooves 757 is larger than the outer diameter of the body 212 at the disengaging grooves 759. Therefore, in the case that the bottom of the engaging groove 757 and the bottom of the disengaging groove 759 of each mounting slot 273 extend substantially continuously, the disengaging grooves 759 can have smaller depth than the engaging grooves 757.

Therefore, when the snap-fit fastener 120 is in the first position, the indicator 750 is restricted by the bottom portion 233 of the snap-fit fastener 120 and cannot move axially. Only when the snap-fit fastener 120 moves to the second position, the indicator 750 is no longer restricted by the bottom portion 233 of the snap-fit fastener 120, and the indicator 750 can move axially forward until the protrusions 755 exit the engaging grooves 757, and then the indicator 750 can be removed from the female connector shell 110 from below.

Figure 8A:
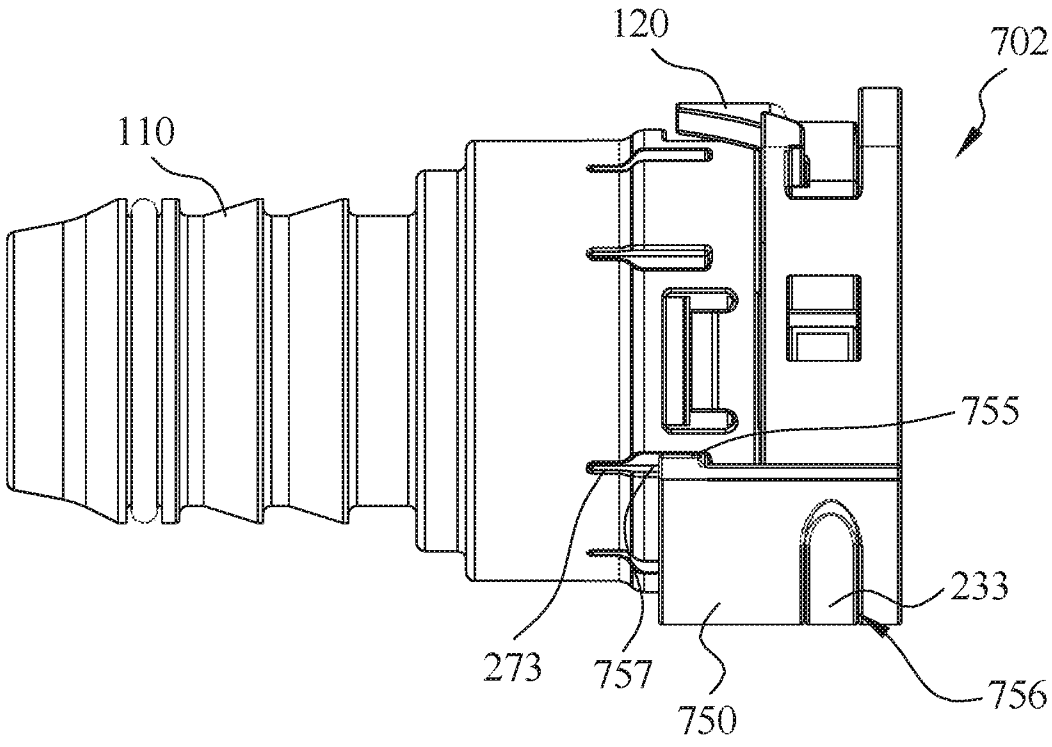
FIGS. 8A and 8B show the structure of the female connector in FIG. 7A when a snap-fit fastener is in a first position.
Figure 8B:
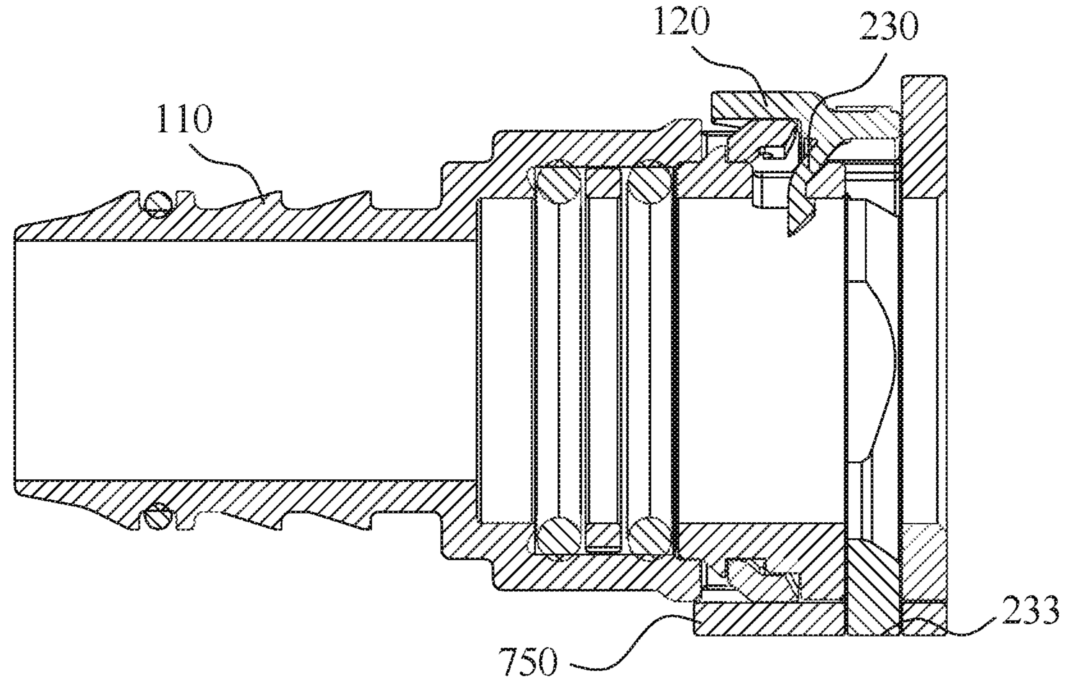

FIGS. 8A and 8B show the structure of the female connector 702 when the snap-fit fastener 120 is in the first position. FIG. 8A shows a side view of the female connector 702, and FIG. 8B shows an axial cross-sectional view of the female connector 702 at the retaining portion 230. As shown in FIGS. 8A and 8B, when the snap-fit fastener 120 is in the first position, the snap-fit fastener 120 is in the bottommost position, and the bottom portion 233 of the snap-fit fastener 120 is also in the bottommost position. In this case, the receiving slot 756 of the indicator 750 receives the bottom portion 233 of the snap-fit fastener 120 so that the indicator 750 cannot move axially. In addition, the protrusions 755 of the indicator 750 engage in the engaging grooves 757 of the mounting slots 273, so that the indicator 750 cannot move radially or circumferentially.

Figure 9A:
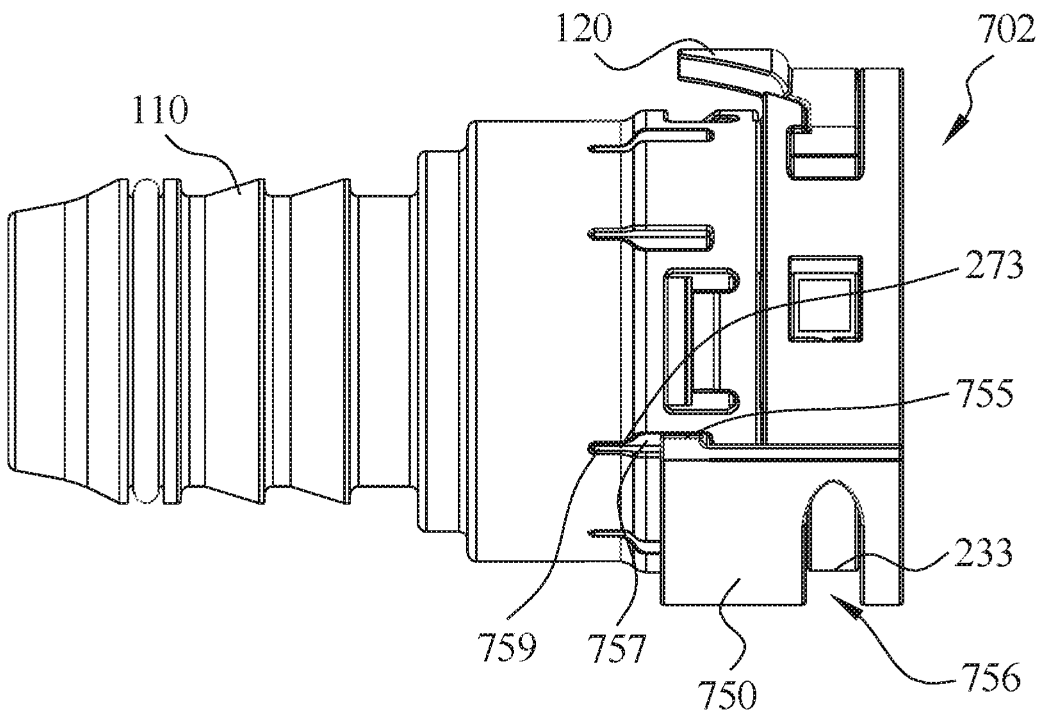
FIGS. 9A and 9B show the structure of the female connector in FIG. 7A when the snap-fit fastener is in a second position.
Figure 9B:
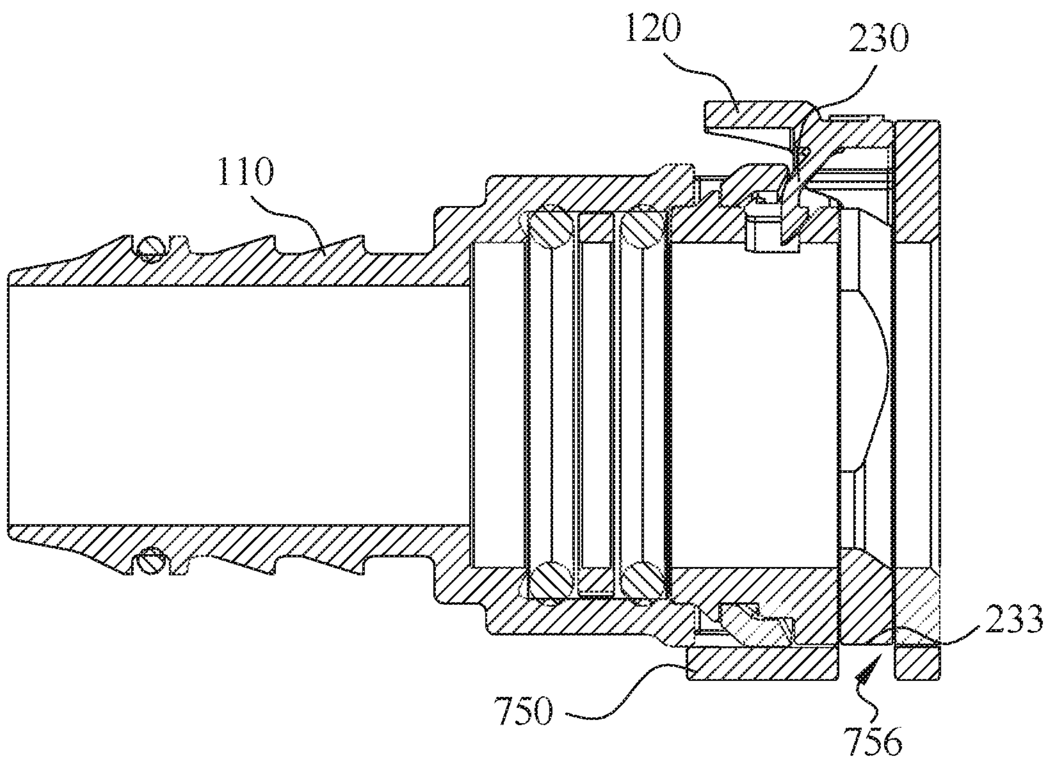

FIGS. 9A and 9B show the structure of the female connector 702 when the snap-fit fastener 120 is in the second position. FIG. 9A shows a side view of the female connector 702, and FIG. 9B shows an axial cross-sectional view of the female connector 702 at the retaining portion 230. As shown in FIGS. 9A and 9B, when the snap-fit fastener 120 is in the second position, the snap-fit fastener 120 is in the topmost position, and the bottom portion 233 of the snap-fit fastener 120 is also in the topmost position. The bottom portion 233 of the snap-fit fastener 120 exits the receiving slot 756 of the indicator 750. In this case, although the protrusions 755 of the indicator 750 still engage in the engaging grooves 757 of the mounting slots 273, so that the indicator 750 cannot move radially or circumferentially, the indicator 750 can move axially. When the operator pushes the indicator 750 leftward (i.e., forward), the protrusions 755 can move into the disengaging grooves 759 of the mounting slots 273, so that the indicator 750 can disengage from the female connector shell 110.

In this embodiment, an indicator 750 is further included on the basis of the structure of the female connector 702, so that the operator can more visually determine whether the male connector is mounted. In addition, the indicator 750 will not affect the movement of the snap-fit fastener 120 and the elastic deformation of the retaining portion 230.

In the female connector and the connector assembly of the present disclosure, the fitting of the male connector and the female connector is implemented by the mating structures of the retaining portion and the locking portion of the female connector. The retaining portion can block the insertion path of the male connector, which does not need for the locking portion to block the insertion path of the male connector, so that the snap-fit fastener can move to the second position only after the male connector is inserted in place. Therefore, the snap-fit fastener in the first position can move to the second position only after the male connector and the female connector are fixed, and thus the appearance of the female connector is inconsistent before and after the male connector is mounted, so that it is possible to visually determine whether the male connector and the female connector are fixed.

In the present disclosure, the operator can visually check whether the bottom of the snap-fit fastener is flush with the outer surface of the female connector shell to determine the position of the snap-fit fastener, and thus determine whether the male connector and the female connector are fixed. In some embodiments, the female connector may also be provided with an indicator to determine whether the male connector and the female connector are fixed by checking whether the indicator can be disengaged. In other embodiments, the extent of exposure of the identifier can indicate whether the male connector and the female connector are fixed. Multiple indication methods are used during the fitting of the connector assembly of the present disclosure, making the indication results more visual and reliable.

In addition, in the present disclosure, the retaining portion elastically deforms under the lateral pushing force of the male connector, and the operator only needs to push the male connector to complete the fitting of the male connector and the female connector, which can facilitate the operator's operation.

In addition, in the present disclosure, the connector assembly is made of a non-metallic material such as plastic, so that the connector assembly of the present disclosure can be applied in corrosive environments, such as seawater or deserts. In addition, in the female connector of the present disclosure, the locking portion of the snap-fit fastener is configured to enter or exit the receiving channel to achieve the function of fixing the male connector, and the retaining portion of the snap-fit fastener is configured to provide elasticity. In some embodiments, since the retaining portion in the form of an elastic piece has a small structure and deforms only during the movement of the snap-fit fastener with a small deformation degree, the retaining portion can be made of plastic. In addition, the snap-fit fastener does not need to deform independently, and the ring shape can further ensure the strength of the snap-fit fastener, so that the structure is stable when the male connector and the female connector are fixed by the snap-fit fastener.

Although the present disclosure is described with respect to the examples of embodiments outlined above, various alternatives, modifications, variations, improvements, and/or substantial equivalents that are known or current or to be anticipated before long may be obvious to those of at least ordinary skill in the art. In addition, the technical effects and/or technical problems described in this specification are exemplary rather than limiting. Therefore, the disclosure in this specification may be used to solve other technical problems and may have other technical effects. Accordingly, the examples of the embodiments of the present disclosure as set forth above are intended to be illustrative rather than limiting. Various changes can be made without departing from the spirit or scope of the present disclosure. Therefore, the present disclosure is intended to include all known or earlier developed alternatives, modifications, variations, improvements and/or substantial equivalents.

DESCRIPTION OF MAIN REFERENCE SIGNS

Connector assembly 100
Female connector 102
Male connector 104
Female connector shell 110
Receiving channel 111
Snap-fit fastener 120
Male connector channel 124
Male connector recess 125
Outer surface 127
Guiding portion 181
Snap-fit slot 208
Body 212
Locking channel 215
Top receiving opening 216
Retaining portion 230
Top portion 231
Locking portion 232
Bottom portion 233
Side portion 234
Cover portion 235
Retaining channel 238
Connecting base 240
Projection 241
Boss 252
Identification area 253
Window 254
Mounting slot 273
Inclined wall 277
Connecting end 336
Free end 337
Guiding surface 342
Bent section 343
Inclined section 344
Vertical section 345
Hook portion 346
Recess 358
Sealing ring 471
Female connector 702
Indicator 750
Mounting portion 751
Protrusion 755
Receiving slot 756
Engaging groove 757
Disengaging groove 759

What is claimed is:

1. A female connector configured to receive and be fixedly connected to a male connector which comprises a male connector recess in an outer side of the male connector, the female connector comprising:

a female connector shell defining a receiving channel extending in an axial direction of the female connector shell to receive the male connector in the axial direction, and comprising a retaining channel and a locking channel which are in communication with the receiving channel and are located on opposite sides of the receiving channel; and a snap-fit fastener movably connected to the female connector shell and comprising a retaining portion and a locking portion, the retaining portion being elastically deformable, and the retaining portion and the locking portion being configured to enter the receiving channel through the retaining channel and the locking channel, respectively, wherein the snap-fit fastener has a first position and a second position, and is movable between the first position and the second position in a radial direction of the female connector shell;

wherein, when the female connector has not yet received the male connector, the snap-fit fastener is in the first position and the retaining portion at least partially extends into the receiving channel through the retaining channel, wherein, when the male connector is received by the female connector and fixed in place by the snap-fit fastener, the snap-fit fastener is in the second position, the recess of the male connector is aligned with the locking channel, the locking portion at least partially enters the recess through the locking channel, and the retaining portion exits the receiving channel and abuts against the outer side of the male connector, and wherein the retaining portion is configured to elastically deform under an action of the male connector to provide a force that drives the snap-fit fastener to move from the first position to the second position.

2. The female connector according to claim 1, wherein, when the male connector is received by the female connector but has not yet been fixed in place, the snap-fit fastener is in the first position, and the retaining portion elastically deforms under the action of the male connector, exits the receiving channel, and abuts against the outer side of the male connector.

3. The female connector according to claim 1, wherein the retaining portion comprises a connecting end and a free end, the free end being movable about the connecting end in a direction away from the receiving channel to elastically deform the retaining portion, and the free end extending into the receiving channel through the retaining channel.

4. The female connector according to claim 3, wherein the retaining portion comprises an engaging portion, and the female connector shell comprises a mating portion, the engaging portion being configured to engage the mating portion to retain the snap-fit fastener in the first position when the female connector has not yet received the male connector.

5. The female connector according to claim 4, wherein the engaging portion comprises a hook portion, and the mating portion is formed by an edge of the retaining channel.

6. The female connector according to claim 5, wherein the retaining portion comprises a guiding surface provided at the free end, the guiding surface is being an inclined surface extending obliquely relative to the radial direction of the female connector shell and is configured to guide the snap-fit fastener from the second position to the first position.

7. The female connector according to claim 6, wherein the mating portion of the female connector shell comprises an inclined wall, a top portion of the inclined wall being an inclined surface complementary to the guiding surface.

8. The female connector according to claim 3, wherein the retaining portion comprises an inclined section, a bent section, and a vertical section, the inclined section connecting the connecting end and the bent section and extending obliquely relative to the radial direction of the female connector shell, and the vertical section connecting the bent section and the free end and extending in the radial direction of the female connector shell.

9. The female connector according to claim 1, wherein the snap-fit fastener further comprises a cover portion located radially outside the retaining portion and outside the female connector shell, and wherein the cover portion abuts against the female connector shell when the snap-fit fastener is in the first position, and is spaced apart from the female connector shell when the snap-fit fastener is in the second position.

10. The female connector according to claim 1, wherein the female connector further comprises an indicator detachably connected to an outer side of the female connector shell and comprising a receiving slot, and wherein, when the snap-fit fastener is in the first position, at least part of the snap-fit fastener extends into the receiving slot to prevent removal of the indicator, and when the snap-fit fastener is in the second position, the snap-fit fastener exits the receiving slot to allow removal of the indicator, thereby indicating that the male connector and the female connector are fixed in place.

11. The female connector according to claim 10, wherein the indicator is slidably connected to the female connector shell in the axial direction.

12. A connector assembly, comprising:

a male connector; and a female connector according to claim 1.

13. A female connector configured to receive and be fixedly connected to a male connector, the male connector comprising a recess in an outer side thereof, the female connector comprising:

a female connector shell defining a receiving channel extending in an axial direction and configured to receive the male connector, the female connector shell further comprising a retaining channel and a locking channel in communication with the receiving channel and located on opposite sides of the receiving channel; and a snap-fit fastener movably connected to the female connector shell and comprising a retaining portion and a locking portion, the retaining portion being elastically deformable, wherein the retaining portion comprises a connecting end and a free end, the free end being movable about the connecting end in a direction away from the receiving channel to elastically deform the retaining portion and extending into the receiving channel through the retaining channel;

wherein the retaining portion comprises an engaging portion, and the female connector shell comprises a mating portion, the engaging portion being configured to engage the mating portion to retain the snap-fit fastener in a first position when the female connector has not yet received the male connector; and wherein the retaining portion is configured to elastically deform under an action of the male connector to drive the snap-fit fastener from the first position to a second position.

14. The female connector according to claim 13, wherein the engaging portion comprises a hook portion, and the mating portion is formed by an edge of the retaining channel.

15. The female connector according to claim 14, wherein the retaining portion comprises a guiding surface at the free end, the guiding surface being an inclined surface extending obliquely relative to the radial direction and configured to guide the snap-fit fastener from the second position to the first position.

16. The female connector according to claim 15, wherein the mating portion comprises an inclined wall having a top surface complementary to the guiding surface.

17. The female connector according to claim 13, wherein the retaining portion comprises an inclined section, a bent section, and a vertical section, the inclined section connecting the connecting end and the bent section, and the vertical section connecting the bent section and the free end.

18. A female connector configured to receive and be fixedly connected to a male connector, the male connector comprising a recess in an outer side thereof, the female connector comprising:

a female connector shell defining a receiving channel and comprising a connecting base;

wherein the connecting base comprises a snap-fit slot, a retaining channel, and a locking channel in communication with the receiving channel; and a snap-fit fastener movably connected to the female connector shell via the snap-fit slot and comprising a retaining portion and a locking portion, the retaining portion being elastically deformable and comprising an engaging portion, wherein the retaining portion and the locking portion are configured to enter the receiving channel through the retaining channel and the locking channel, respectively; and wherein the retaining portion is configured to elastically deform under an action of the male connector to drive the snap-fit fastener from a first position to a second position.

19. The female connector according to claim 18, wherein the engaging portion comprises a hook portion, and the mating portion is formed by an edge of the retaining channel.

* * * * *